(12) United States Patent
Moser et al.

(10) Patent No.: US 11,635,126 B2
(45) Date of Patent: Apr. 25, 2023

(54) ANGULAR TRANSMISSION DEVICE

(71) Applicant: MPS Micro Precision Systems AG, Bienne (CH)

(72) Inventors: Yves Moser, Le Landeron (CH); Vincent Wahli, Port (CH)

(73) Assignee: MPS Micro Precision Systems AG, Bienne (CH)

(*) Notice: Subject to any disclaimer, the term of this patent is extended or adjusted under 35 U.S.C. 154(b) by 206 days.

(21) Appl. No.: 17/296,505

(22) PCT Filed: Sep. 10, 2019

(86) PCT No.: PCT/IB2019/057599
§ 371 (c)(1),
(2) Date: May 24, 2021

(87) PCT Pub. No.: WO2020/109876
PCT Pub. Date: Jun. 4, 2020

(65) Prior Publication Data
US 2022/0034390 A1    Feb. 3, 2022

(30) Foreign Application Priority Data
Nov. 26, 2018  (CH) .................................. 01457/18

(51) Int. Cl.
*F16H 25/22*    (2006.01)
*F16H 1/16*    (2006.01)
(Continued)

(52) U.S. Cl.
CPC ......... *F16H 25/2204* (2013.01); *F16H 1/163* (2013.01); *F16H 19/005* (2013.01); *F16H 19/0622* (2013.01); *F16H 2019/0668* (2013.01)

(58) Field of Classification Search
CPC ......... F16H 2019/0668; F16H 19/0622; F16H 19/005; F16H 1/163; F16H 25/2204
See application file for complete search history.

(56) References Cited

U.S. PATENT DOCUMENTS 3,025,647 A    3/1962  Moody
3,377,879 A *  4/1968  Shiwaku .................. F16H 1/163
                                                            74/425

(Continued)

FOREIGN PATENT DOCUMENTS

DE    102010062561 A1    6/2012
DE    102012022438 B3    2/2014
GB         2134210 A     8/1984

OTHER PUBLICATIONS

International Search Report & Written Opinion for PCT/IB2019/057599, dated Nov. 8, 2019, 6 pgs.

*Primary Examiner* — David M Fenstermacher
(74) *Attorney, Agent, or Firm* — Blank Rome LLP (57) ABSTRACT

The present invention concerns an angular transmission device comprising: An input shaft and an output shaft, An assembly arranged for coupling the input shaft with the output shaft so that the output shaft can be rotationally driven by the input shaft, the assembly comprising a rotary actuator and a linear mobile, the rotary actuator being coupled with the input shaft and moves the mobile in a translation motion relative to the actuator, the mobile being coupled with the output shaft so that the rotation of the input shaft drives the rotation of the output shaft; the assembly further comprises a flexible blade fixed to said mobile and looped around the output shaft, so that when the actuator moves the mobile, the flexible blade drives the rotation of the output shaft. The invention also comprises a method using said device.

21 Claims, 5 Drawing Sheets

(51) Int. Cl.
*F16H 19/00* (2006.01)
*F16H 19/06* (2006.01)

(56) References Cited

U.S. PATENT DOCUMENTS

| | | | | |
|---|---|---|---|---|
| 3,581,592 | A | * | 6/1971 | Roehrs ................ F16H 25/2204 74/464 |
| 4,023,433 | A | * | 5/1977 | Schutz ................... F16H 1/163 74/424.89 |
| RE30,049 | E | * | 7/1979 | Schutz ................... F16H 1/163 74/425 |
| 4,951,519 | A | * | 8/1990 | Ohtsuka ................. F16H 1/163 74/425 |
| 5,090,266 | A | * | 2/1992 | Otsuka ................... F16H 1/163 74/425 |
| 5,237,886 | A | * | 8/1993 | Kellar .................... F16H 1/163 74/440 |
| 5,655,410 | A | * | 8/1997 | Nakamura .............. F16H 1/163 74/425 |
| 2003/0115981 | A1 | * | 6/2003 | Stoianovici ............ F16H 1/163 74/425 |
| 2006/0156845 | A1 | * | 7/2006 | Tong ...................... F16H 1/163 74/425 |
| 2009/0308192 | A1 | | 12/2009 | Lin et al. |
| 2011/0179893 | A1 | * | 7/2011 | Elliott ...................... B64C 9/02 74/25 |
| 2012/0137800 | A1 | * | 6/2012 | Park .................... F16H 63/3466 74/89.2 |
| 2015/0167830 | A1 | * | 6/2015 | Orita ................... F16H 25/2204 477/20 |
| 2016/0201761 | A1 | * | 7/2016 | Kwon ....................... F16D 3/68 74/425 |
| 2016/0333996 | A1 | * | 11/2016 | Gianfranceschi ......... C23C 4/18 |
| 2017/0043865 | A1 | | 2/2017 | Quenerch'Du et al. |
| 2017/0108083 | A1 | * | 4/2017 | Chiu ....................... F16H 1/163 |
| 2018/0058544 | A1 | * | 3/2018 | Armstong ............... F16H 1/163 |
| 2018/0244305 | A1 | * | 8/2018 | Cai ...................... F16H 25/2214 |
| 2021/0123504 | A1 | * | 4/2021 | Kopecek ................. F16H 1/30 |
| 2021/0156461 | A1 | * | 5/2021 | Nitta ....................... F16H 55/22 |

\* cited by examiner

PRIOR ART

ANGULAR TRANSMISSION DEVICE

RELATED APPLICATIONS

This application is a national phase of PCT/IB2019/057599, filed on Sep. 10, 2019, which claims the benefit of Swiss Patent Application No. 01457/18, filed on Nov. 26, 2018. The entire contents of these applications are hereby incorporated by reference.

FIELD OF THE INVENTION

The present invention concerns an angular transmission device and a method using said device.

DESCRIPTION OF RELATED ART

Angular transmission devices are mechanical devices allowing the transmission of rotational motion between two shafts, each shaft rotating around a rotation axis. In most cases, angular transmission devices are right angle transmission devices, where the first and second shaft are perpendicular.

Figure 1:
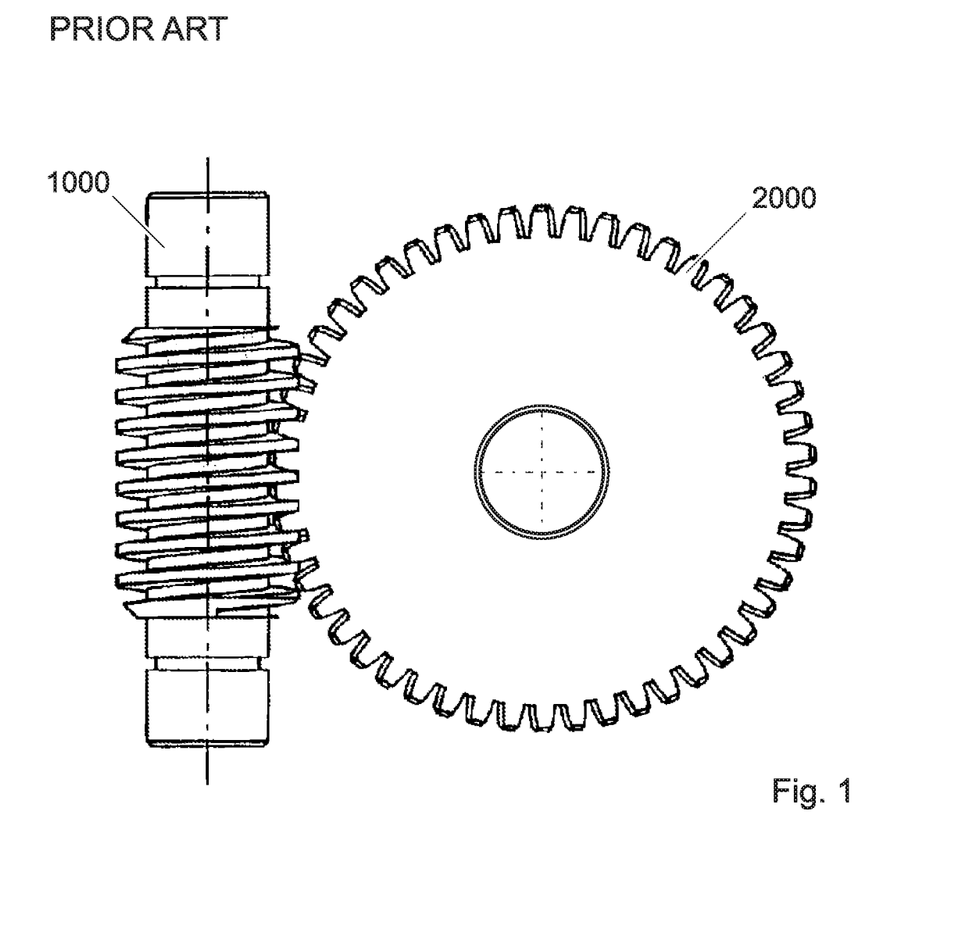
FIGS. 1 and 2 show overviews of angular transmission devices according to the prior art.

Worm transmission is one of the known solutions for angular transmission devices. A classic worm transmission is shown in FIG. 1. In this example, the transmission has two main components, the worm 1000 and the gear 2000, in other words a toothed wheel, the helical shaped teeth of the worm 1000 being meshed with the external teeth of the wheel 2000. When the worm 1000 turns, the teeth of the worm engage the gear teeth of the gear to drive the rotation of the gear 2000. During motion, there is a continuous sliding of the worm and gear teeth. For this, the transmission requires sustained lubrication to minimize the friction and to reduce the wear of the teeth with which it is in contact. The lubricant also helps dissipating the heat generated during the continuous sliding of the teeth in contact.

The gap between the worm teeth and the gear teeth depends on the distance between the axes of the worm 1000 and gear 2000. Ideally, the distance between axes is set in such a manner that the gap between the teeth is zero. In practice, this perfect condition is impossible to achieve due to misalignment and manufacturing deviations or adjustments. In addition, a perfect condition, if any, is impossible to maintain because of the wear of the surfaces of the teeth in contact during motion. Clearance between the teeth induce a backlash in the transmission. On the contrary, in case of interference, the friction creates an important wear of the surfaces in contact, so that the transmission becomes either blocked or highly inefficient. Also, such transmissions are generally made of heavy material capable of resisting to wear, thus increasing the inertia of the systems.

Figure 2:
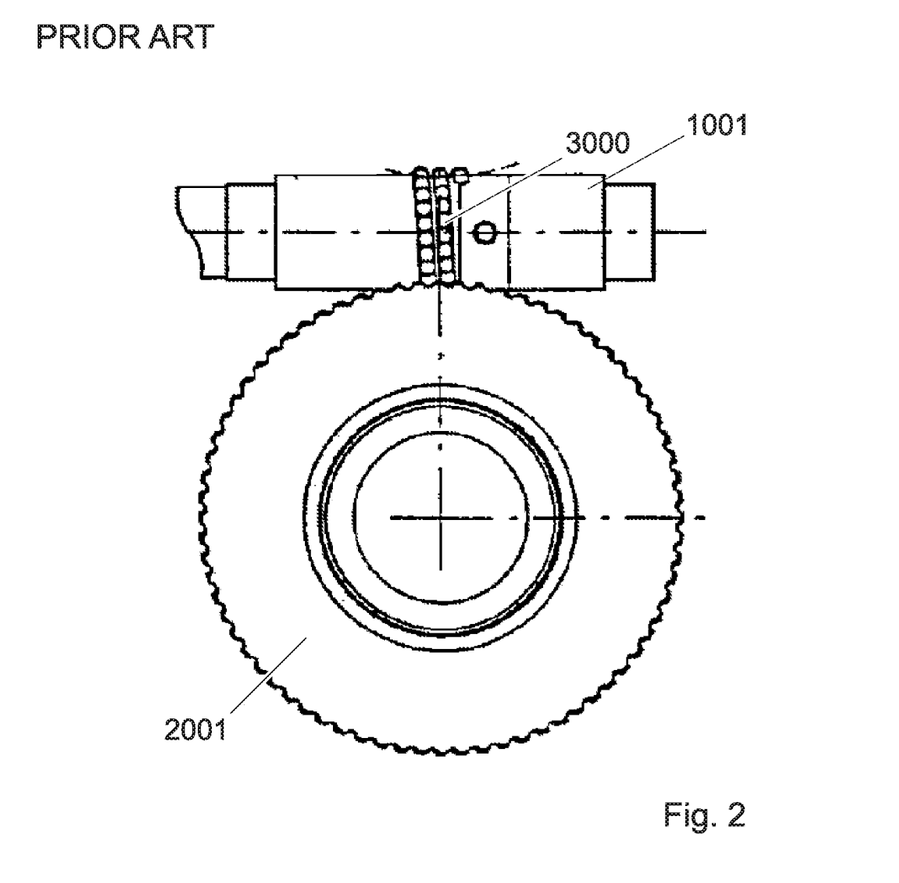

Alternatively, ball worm transmissions are also used for angular transmission. The document US20030115981 describes a ball worm transmission illustrated in FIG. 2. In such systems, balls 3000 are at the interface between the worm 1001 and the gear 2001 to transmit the torque. The balls ensure a higher efficiency than worm transmission. The backlash is also significantly reduced. But ball worm transmissions suffer from a poor load capacity because of the low number of balls taking the load during the motion.

A similar solution is used for steering shafts in vehicles, having as input shaft a ball screw that drives linearly the nut sub-assembly that has a bushing with a rack. The rack drives the output shaft in rotation.

There is a need to provide an angular transmission limiting the drawbacks of the existing solutions.

BRIEF SUMMARY OF THE INVENTION

According to the invention, these aims are achieved by means of an angular transmission device comprising:
An input shaft rotating around a first rotation axis and an output shaft rotating around a second rotation axis;
An assembly arranged for coupling the input shaft with the output shaft in such a manner that the output shaft can be rotationally driven by the input shaft, said assembly transforming the rotation of the input shaft around said first rotation axis into the rotation of the output shaft around the second rotation axis;
the assembly comprising a rotary actuator and a linear mobile, the rotary actuator being coupled with the input shaft and arranged to move the linear mobile in a translation motion relative to the actuator, the linear mobile being coupled with the output shaft so that the rotation of the input shaft drives the rotation of the output shaft;
the assembly further comprising a flexible blade fixed to said linear mobile and looped around the output shaft, so that when the actuator moves the linear mobile, the flexible blade drives the rotation of the output shaft.

The claimed angular transmission device differs from the existing solutions at least in that it comprises a flexible blade that drives the rotation of the output shaft. The blade is fixed to a mobile that cooperates with the input shaft. The rotation of the input shaft moves the mobile in a translation motion: the motion of the mobile drives the motion of the blade that is fixed thereon. The blade is looped around the output shaft, so that said blade is integral with the output shaft.

The mobile moves in a translation motion along the first rotation axis of the input shaft upon rotation of said input shaft. The translation of the mobile induces the rotation of the output gear that is driven by the flexible blade.

Advantageously, the blade provides a high efficiency of transmission, in particular a higher efficiency than the existing solutions, whether worm transmission or ball worm transmission that have an efficiency approximately between 50% and 90%.

The efficiency of the blade is 100%, or close to 100%, for instance at least 95%, preferably 98%. Thus, there is no or only a negligible loss in transmission between the input shaft and the output shaft, for instance torque or speed loss. This is particularly advantageous for applications where integration or little consumption are of essence, such as fin and flap actuators, lens and mirror steerers/shifters, portable instruments, etc.

Worm transmission devices suffer from clearance or interference issues that significantly impact the accuracy of these devices because the worm and wheel teeth are either too close or too far apart. In the claimed angular transmission device, the blade is looped in tension around the output shaft so that there is no interference or clearance issues. On the contrary, there is a continuous contact between the blade and the output shaft, the blade is integral with the output shaft thereby providing an increased accuracy in the angular position of the output shaft.

The increased accuracy in the angular positioning is particularly advantageous for applications requiring specific angular positioning, for example optical devices with lens such as telescopes, and guiding instruments such as satellites.

The claimed device is lighter than existing solutions for instance worm or worm ball transmissions. The inertia force is lower, thus providing an improved performance for high acceleration transmissions.

The claimed invention is also compact, in other words a small footprint. This facilitates the integration of the claimed device into a system or an instrument.

In worm transmission devices, the contact or friction between the worm and wheel teeth induces wear of the contact surfaces. In the present invention, the wheel teeth are replaced by a blade to minimize wear. Therefore, the claimed device has an extended lifetime.

The blade is made of material with a predetermined fatigue. In particular, the material of the blade is chosen depending on its theoretical fatigue limit so that the stress on the blade is below this fatigue limit. The goal is to provide a blade allowing a high and unlimited number of cycles.

In an embodiment, the rotary actuator comprises a ball screw and the mobile comprises at least one ball nut, the device comprising a plurality of balls circulating between the ball screw and the ball nut so that the balls transmit the torque between the ball screw to the ball nut(s) to move the ball nut(s) in a linear motion. The rotation of the input shaft drives the ball screw and generates the linear motion of the ball nut(s) that drives the rotation of the output shaft.

Alternatively, the above-described opposite configuration can also be made in another embodiment. When rotating the ball nut sub-assembly, as input shaft, the ball screw becomes the linear mobile, on which will be fixed the flexible blade that drives, in rotation, the output shaft. Such linear motion driving system is called a "non-captive" ball screw (or leadscrew) actuator.

Advantageously, balls circulating between the ball screw and the ball nut allow a coupling free from play between the nut and the screw.

Moreover, the recirculation of balls screws provides a transmission free or almost free from lubricant, as opposed to worm transmissions where the teeth in contact are typically in a lubricant bath. In particular, ceramic balls can be used for a lubricant free coupling.

The recirculation of ball screws also provides relevant efficiencies for a transmission device, typically above 90%.

In an embodiment, the actuator comprises a lead screw or ball screw and the linear mobile comprises at least a nut or ball nut, the screw being coupled with said nut to move said nut in a linear motion relative to the screw. The rotation of the input shaft drives the screw and generates the linear motion of the nut that drives the rotation of the output shaft. As mentioned previously, the screw and nut can be reversed to provide the same result that is transforming a rotational to a linear motion.

In an embodiment, the linear mobile comprises at least a nut and a housing integral with said nut, the flexible blade being fixed on said housing. Preferably, the nut is a ball nut when the actuator comprises a ball screw. The housing is used to ensure the mechanical link between the nut and the flexible blade.

In an embodiment, the rotary actuator comprises a rotary motor, preferably a brushless motor, a DC motor, a stepper motor, a piezo motor or a voice coil.

In an embodiment, the flexible blade comprises two ends and a loop, said loop being between said two ends, said ends being fixed to the linear mobile.

In an embodiment, the blade could be replaced by a flexible cable, which could be wound around the said output shaft and fixed at both ends to the said housing.

In an embodiment, the device is arranged to be in contact with or to have a gap between the flexible blade and the linear mobile. The gap is used to compensate a possible inconstant misalignment. During the linear movement of the mobile, a variable radial force will be applied on the ball screw, through the ball nut and the housing.

In an embodiment, the flexible blade is made or mainly made of metal. In another embodiment, the flexible blade could also be made or mainly made of composite material or polymer.

In an embodiment, the input shaft and/or the output shaft, preferably the input shaft and the output shaft, are mounted on at least one ball bearing and configured to tolerate thermal expansion.

In an embodiment, the flexible blade allows angular rotation of the output shaft between −1000° and 1000°, preferably between about −180° and +180°, more preferably between −30° and +30°. Generally, the angular rotation range varies depending on the application:
  Large angular rotations are used for example in telemetry, turrets for solar panels, radars and telescopes on the ground or on satellites.
  Limited angular rotations are used in lens and mirror angular positioners for example for laser welding, cutting and etching applications, ophthalmology, additive manufacturing, control actuation systems, fin and flap actuators (fluid deflectors), steering shafts in vehicles, etc.

In an embodiment, the flexible blade allows for the control of the angular position of the output shaft between a plurality of discreet indexed positions. For instance, the output shaft operates three distinct positions, in other words discreet positions, for instance a first position at X degree, then a second position at Y degree and a final position at Z degree. This could be used for an automation process, using for example palletization and/or a pick and place system.

In an embodiment, the flexible blade allows for the control of the angular position of the output shaft on an operational range comprised between a first angular position and a second angular position. For instance, the output shaft can operate between a position at X degree and a position at Y degree, for instance between −50° and +50°. This could be used for a solar panel or a flap actuator.

In an embodiment, the device is a reducer for reducing the speed between the input shaft and the output shaft, preferably with a reduction ratio between 1:1 and 1:20000, more preferably between about 1:1 and 1:2000, in particular between 1:1 and 1:200.

In an embodiment, the first rotation axis being perpendicular to the second rotation axis. Many applications require right angular transmission devices, for instance in automotive, machine tools, conveyors, guillotine doors, etc. Right angle means that the angle between the input shaft and the output shaft is equal to 90°. However, the present application is not limited to right angular transmission devices.

In an embodiment, the device could comprise an adjustment screw to define a precise preload on the flexible blade. This preload will impact the radial force on the ball screw due to the inconstant misalignment.

The invention also concerns a method for transforming a rotation around a first axis into a rotation into a second axis, the method using a device according to the invention.

In the present invention, the term "the flexible blade fixed on the mobile" refers to a blade mounted on or coupled to the mobile. The blade is integral with the mobile, in other words if the mobile moves, the blade moves, and the motion of the blade correlates with the motion of the mobile.

In the present invention, the term "housing" designates a component arranged to—receive the nut and to be coupled with the flexible blade. The housing comprises an external surface with a portion opposite to the output shaft on which the blade is fixed.

In the present invention, the term "reducer" or "gear train reducer" refers to a device for increasing the torque between the input shaft and the output shaft. The reducer is in particular a speed reducer for reducing the rotation speed of the output shaft compared to the rotation speed of the input shaft.

In the present invention, the term "flexible blade" defines a blade made of a material having a flexibility allowing the motion of the mobile relative to the output shaft when the blade is looped around said output shaft. The motion of the mobile unwinds a portion of the blade and winds up another portion of the blade so that the blade follows the outline of the output shaft. The blade needs to be made of a flexible material to allow for unwinding and winding up said blade around the output shaft depending on the motion of the mobile. The terms "blade" and "flexible blade" are synonyms and interchangeable.

In the present invention, the word "device" designates the "angular transmission device" according to the invention, to simplify the reading of the text.

In the present invention, the word "mobile" designates the "linear mobile" to simplify the reading of the text.

The embodiments of the angular transmission device also apply to the method according to the present invention mutatis mutandis.

BRIEF DESCRIPTION OF THE DRAWINGS

The invention will be better understood with the aid of the description of embodiments given by way of examples and illustrated by the figures, in which.

DETAILED DESCRIPTION OF POSSIBLE EMBODIMENTS OF THE INVENTION

Figure 3A:
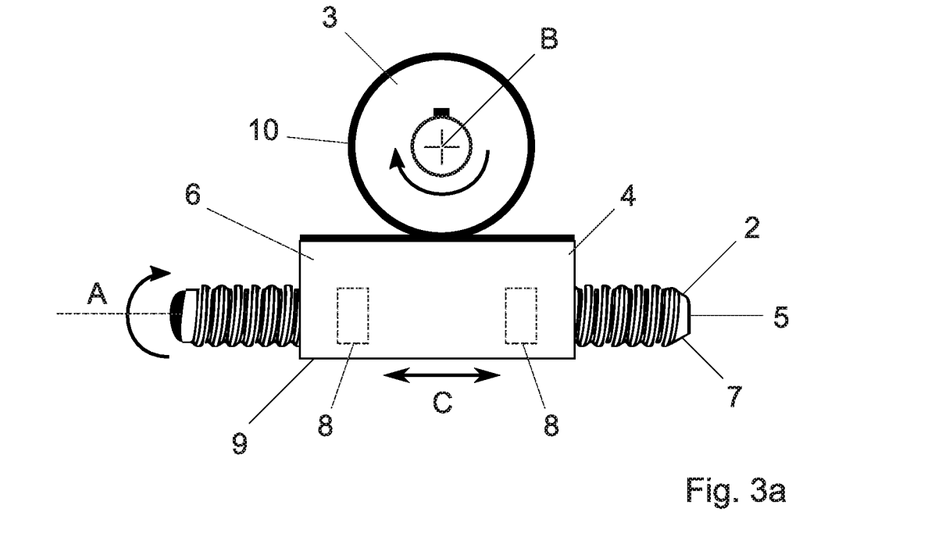
FIGS. 3a,b illustrate the device according to a first embodiment.
Figure 3B:
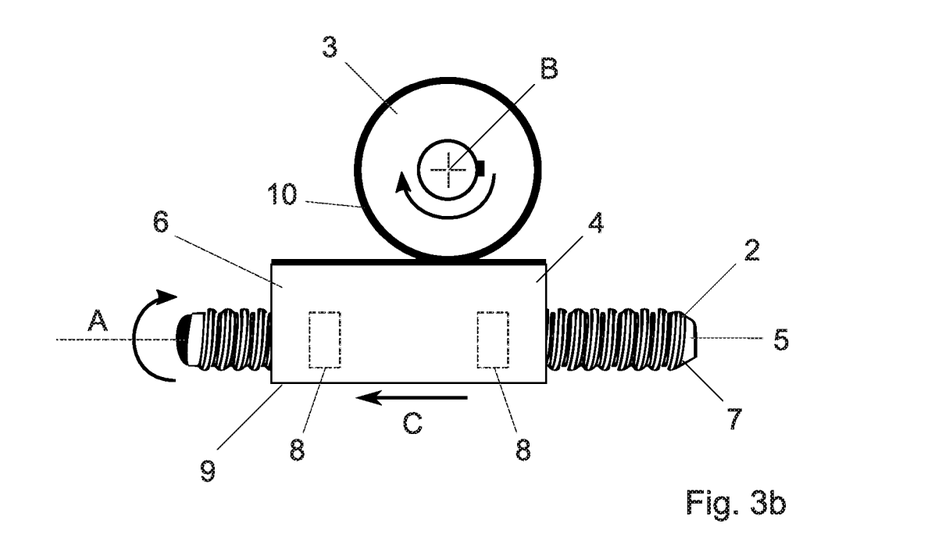
Figure 4:
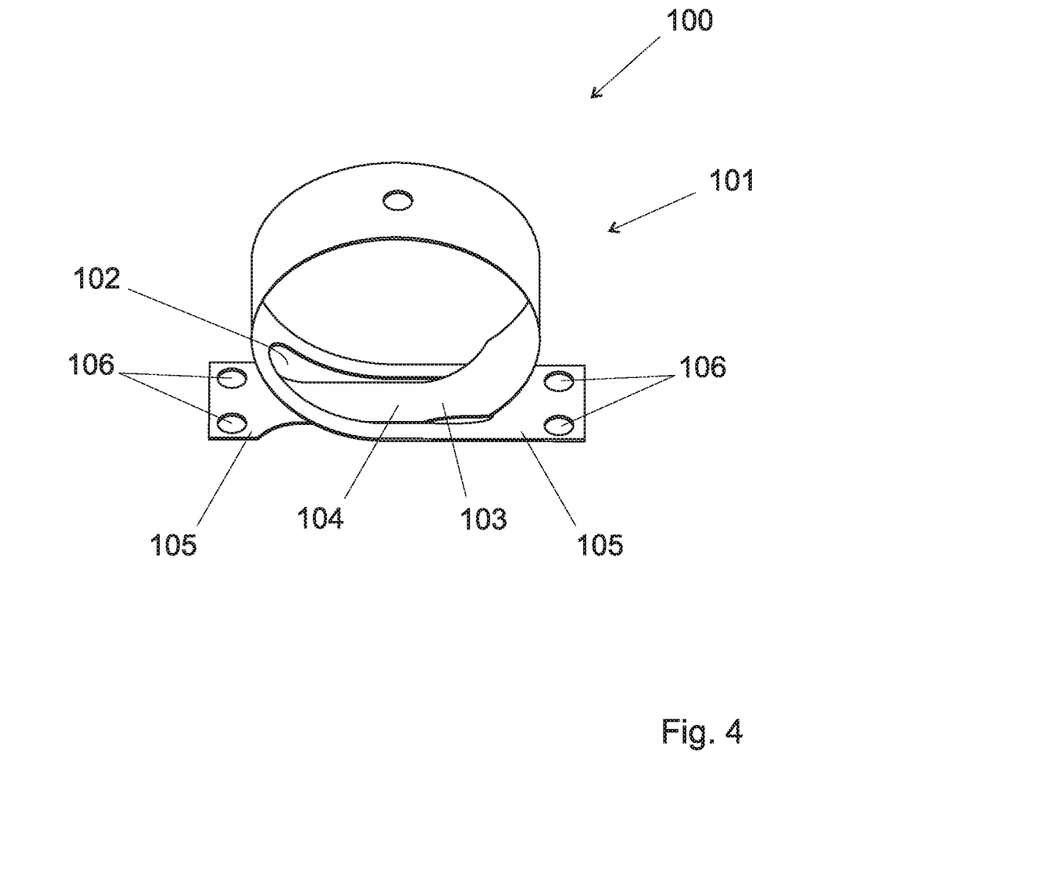
FIG. 4 illustrates a flexible blade for a device according to the invention.
Figure 5:
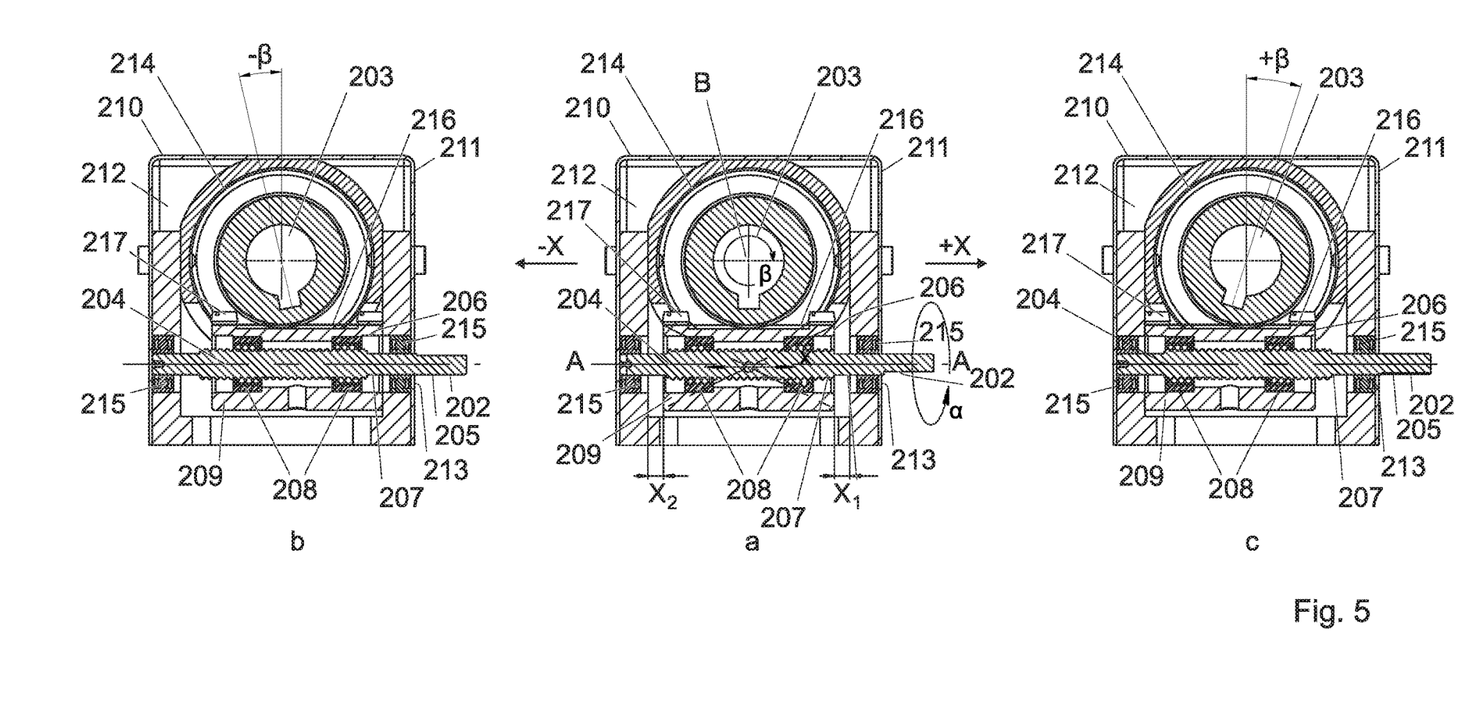
FIGS. 5a to 5c illustrate a device according to a second embodiment.

FIGS. 3 to 5 illustrate some embodiments of the present invention but the invention is not limited to the disclosed embodiments.

FIG. 3a,b show a device 1 according to a first embodiment. In particular, FIG. 3a,b illustrate the functioning, i.e. the concept, of the angular transmission device 1 according to the invention.

The device 1 comprises an input shaft 2 rotating around a first rotation axis A and an output shaft 3 rotating around a second rotation axis B. In the present embodiment, the first axis A is perpendicular to the second rotation axis B.

The device further comprises an assembly 4 arranged to couple the input shaft 2 with the output shaft 3. The assembly 4 allows for the transformation of the rotation of the input shaft 2 around said first rotation axis A into the rotation of the output shaft 3 around the second rotation axis B.

The assembly 4 comprises a rotary actuator 5 and a linear mobile 6 coupled to said rotary actuator 5. The rotation of the rotary actuator 5 drives the linear mobile 6 in a translation motion. The role of the assembly 4 is to ensure the transmission of the force, and torque between the input shaft 2 and the output shaft 3.

In the present embodiment, the rotary actuator 5 is a ball screw 7 and the linear mobile 6 comprises two ball nuts 8 received in a housing 9, said nuts 8 being integral with said housing 9, so that when the screw 7 drives the nuts 8, the housing 9 moves accordingly.

The screw 7 is coupled to the input shaft 2; and the housing 9 is coupled to the output shaft 3.

Alternatively, the screw is a lead screw coupled to at least a corresponding nut (not represented in figures).

The assembly 4 further comprises a coupling element for the transmission of the motion of the mobile 6 to the output shaft 3. In other words, in this example, the coupling element is the flexible blade 10 ensuring the transmission of the forces between the mobile 6 and the output shaft 3, and thus between the input shaft 2 and the output shaft 3. The flexible blade 10 is fixed to the housing 9 and looped around the output shaft 3.

In FIG. 3a, the device 1 is in an initial position where the input shaft 2 and the output shaft 3 are immobile, i.e. motionless.

In FIG. 3b, the screw 7 is rotating. The rotation of the screw 7 drives the nuts 8 and the housing 9 in a linear motion in a direction parallel to the first rotation axis of the axis of the ball screw 7. While the housing 9 moves in a translation motion, the flexible blade 10, looped around the output shaft 3, drives the rotation of the output shaft 3.

FIG. 4 illustrates an embodiment of a flexible blade 100 that can be used in the claimed device 1, 201. The blade 100 is a strip made of 301 stainless steel. In the present embodiment, the strip has 6.5 mm width, 80 mm length, 0.1 mm thick but the invention is not limited to these dimensions. Advantageously, the dimensions are comprised:

Between 0.5 and 1000 mm wide;
Between 1 and 5000 mm long;
Between 0.01 and 2 mm thick.

The flexible blade 100 comprises a flexible ribbon 101 comprising an aperture 102 and a narrow portion 103. The narrow portion 103 is inserted into the aperture 102 to form a loop 104, said loop 104 being designed to circle or loop around the output shaft (not represented in FIG. 4). The ribbon 103 comprises two ends 105 each equipped with traversing holes 106 to fix said blade 100 onto the mobile. For instance, the blade 100 is screwed onto the mobile via the holes 106.

FIGS. 5a-c show a device 201 according to a second embodiment. The device 201 comprises an input shaft 202 coupled to an output shaft 203 via an assembly 204. Advantageously, the device 201 reducer allows for a reduction ratio of 56 between the input shaft 201 and the output shaft 202.

The device 201 comprises a rotatory actuator 205 and a linear mobile 206:

The rotatory actuator 205 comprising a ball screw 207;
The linear mobile 206 comprising two ball nuts 208 received and integral with a housing 209.

The device 201 is received in a casing 210, for instance a polygonal casing as illustrated in FIG. 5. The casing 210 comprises an input face 211 and an output face 212:

The input face 211 comprising an input window 213 for operating the input shaft 202; for instance for coupling the input shaft 202 to a rotary motor (not represented in the figures);

The output face 212 comprising an output window 214 for operating the output shaft 212; for instance for coupling the output shaft 212 to an instrument and controlling the angular position of said instrument, for instance a solar panel, optical devices etc. (not represented in the figures);

The ball screw 207 is mounted on two ball bearings 215. Preferably, the output shaft 203 is also mounted on ball bearing(s) (not represented in the figures).

A flexible blade 216 is fixed to the housing 209. In the present example, the blade 216 is screwed onto the housing with four fixing screws 217 after having adjusted the preload force on the flexible blade using the preloading screws. Once the fixing screws have been tightened with a given torque and using thread lock adhesive, the preloading screws can be removed.

In the present embodiment, the device 201 can adopt three configurations as illustrated in FIGS. 5a-c:
 An initial configuration P0 before the rotation of the input shaft 202, shown in FIG. 5a;
 A first configuration P1 after the rotation of the input shaft with an angle of −α (plus alpha), shown in FIG. 5b;
 A second configuration P2 after the rotation of the input shaft with an angle of −α (plus alpha) shown in FIG. 5c;

The rotation of the input shaft with an angle of −α (plus alpha) moves the mobile in a linear translation so that the flexible blade drives the rotation of the output shaft with an angle of +β (plus beta).

The rotation of the input shaft with an angle of −α (minus alpha) moves the mobile in a linear translation so that the flexible blade drives the rotation of the output shaft with an angle of −β (minus beta).

In the present embodiment, the angular position of the output shaft 203 varies on an operational range between a first angular position −β (minus beta) and a second angular position +β (plus beta). The output shaft can adopt any angular position within the interval defined by the first angular position and the second angular position.

In another embodiment (not illustrated), the device can also be configured to limit the angular positions of the output shaft to a plurality of discreet indexed positions X1, X2, Xn. For instance, the output shaft is either in a position X1 corresponding to an angle beta of X degree, or position X2 corresponding to an angle beta of X degree.

The invention claimed is:

1. Angle transmission device comprising:
 an input shaft rotating around a first rotation axis and an output shaft rotating around a second rotation axis,
 an assembly arranged to couple the input shaft with the output shaft so that the output shaft can be rotationally driven by the input shaft, said assembly allowing for the transformation of the rotation of the input shaft around said first rotation axis into the rotation of the output shaft around the second rotation axis;
 the assembly comprising a rotary actuator and a linear mobile, the rotary actuator being coupled with the input shaft and arranged for moving the linear mobile in a translation motion relative to the actuator, the linear mobile being coupled with the output shaft so that the rotation of the input shaft can drive the rotation of the output shaft;
 the device being characterized in that the assembly further comprises a flexible blade or a flexible cable fixed to said linear mobile and looped around the output shaft, so that when the actuator moves the linear mobile, the flexible blade or the flexible cable drives the rotation of the output shaft.

2. Device according to claim 1, wherein the rotary actuator comprises a ball screw and the mobile comprises a ball nut, the device comprising a plurality of balls circulating between the ball screw and the ball nut so that the balls transmit the torque between the ball screw to the ball nut to move the ball nut in a linear motion, and wherein the rotation of the input shaft drives the ball screw and generates the linear motion of the ball nut that drives the rotation of the output shaft.

3. Device according to claim 1, wherein the actuator comprises a lead screw and the linear mobile comprises at least a nut, the lead screw being coupled with said nut to move said nut in a linear motion relative to the lead screw, the rotation of the input shaft drives the lead screw and generates the linear motion of the nut that drives the rotation of the output shaft.

4. Device according to claim 1, wherein the linear mobile comprises at least a nut and a housing integral with said nut, the flexible blade or the flexible cable being fixed on said housing.

5. Device according to claim 1, wherein the rotary actuator comprises a rotary motor.

6. Device according to claim 1, wherein the flexible blade or the flexible cable comprises two ends and a loop, said loop being between said two ends, said ends being fixed to the linear mobile.

7. Device according to claim 1, wherein the device is arranged to be in contact or to have a gap between the flexible blade or the flexible cable and the linear mobile.

8. Device according to claim 1, wherein the flexible blade or the flexible cable is made of metal or polymer.

9. Device according to claim 1, wherein the input shaft and/or the output shaft is mounted on at least one ball bearing.

10. Device according to claim 1, wherein the flexible blade or the flexible cable allows the angular rotation of the output shaft between −1000° and 1000°.

11. Device according to claim 1, wherein the flexible blade or the flexible cable allows for the control of the angular position of the output shaft between a plurality of discreet indexed positions.

12. Device according to claim 1, wherein the flexible blade or the flexible cable allows for the control of the angular position of the output shaft on an operational range comprised between a first angular position and a second angular position.

13. Device according to claim 1, wherein the device is a reducer for reducing the torque and/or the speed between the input shaft and the output shaft.

14. Device according to claim 1, wherein the first rotation axis is perpendicular to the second rotation axis.

15. Method for transforming a rotation around a first axis into a rotation into a second axis, the method using a device according to claim 1.

16. Device according to claim 5, said rotary motor being a brushless motor, a stepper motor, a piezo motor, a voice coil or a DC motor.

17. Device according to claim 10, said angular rotation of the output shaft being between −180° and +180°.

18. Device according to claim 17, said angular rotation of the output shaft being between −30° and +30°.

19. Device according to claim 13, a reduction ratio of said reducer being comprised between 1:1 and 1:20000.

20. Device according to claim 19, a reduction ratio of said reducer being comprised between 1:1 and 1:2000.

21. Device according to claim 20, said reduction ratio being comprised between 1:1 and 1:200.

\* \* \* \* \*